United States Patent Office 3,427,613
Patented Feb. 11, 1969

3,427,613
OBJECT IDENTIFICATION SYSTEM
Masao Kawahara, Kawasaki-shi, Yoshitsugu Ono, Yokohama-shi, and Johji Sakuragi, Tokyo, Japan, assignors to Tokyo Shibaura Electric Co., Ltd., Kawasaki-shi, Japan, a corporation of Japan
Filed Feb. 27, 1967, Ser. No. 618,957
Claims priority, application Japan, Mar. 2, 1966, 41/12,215; Mar. 25, 1966, 41/18,478
U.S. Cl. 343—6.5        16 Claims
Int. Cl. G01s 9/56

ABSTRACT OF THE DISCLOSURE

Signals of different frequencies are angle-modulated and transmitted to the object to be identified. The object is provided with tuning circuits which select the several signals indicating a specific object through a combination code among the received signals. The signal having passed through the tuning circuits is reflected out to the receiver. The receiver then detects only a distortion component that has been produced as the angle-modulated i.e., phase-angle modulated signals passed through the tuning circuits, then interprets the code consisting of a combination of frequencies of the said distortion so as to identify the object correctly, and identify the object whose $S/N$ ratio is very large.

---

This invention relates to object identification system, and more particularly to an identification system for moving objects such as vehicles, which is capable of identifying them by the vehicle number, type and other characteristics by utilizing electromagnetic induction effects.

A system of this nature heretofore proposed functions as follows: Many signals of different frequencies are transmitted from a transmitter to the object to be identified, and tuning circuits carried in the object receive the signals and reflect only several specific signals which compose a code indicating the specific object according to a combination of frequencies. The receiver then receives the signals thus reflected interprets the code and thereby identifies the object.

This prior art system adopts a signal detection method in which signals and noise signals are detected by sensing the magnitude of amplitudes of the signals passing both through the center of a tuning characteristics curve of the tuning circuits provided in the object to be identified and through the band, e.g., band edge of the curve away from the center. In such, signal detection system, however, it is difficult to provide a large signal-to-noise ratio (hereinafter called "$S/N$ ratio") chiefly, because of the selectivity of the tuning circuits carried in the object. Therefore, the receiving signal level responds to fluctuation with varying levels of the signal transmitted from the transmitter because of power and voltage change or variations in the electromagnetic object itself, with the result that the amount of mis-detection is increased.

The system according to this invention comprises a transmitter which sends out many angle-modulated signals of different frequencies, a response device located in the object having a plurality of response tuning circuits that are tuned to several specific signals among the angle-modulated signals transmitted from the transmitter, and which reflects only several specific signals composing a code indicating the specific object, and a receiver which receives these specific signals reflected from the response device. The transmitter has oscillators which generate carriers of different frequencies, an oscillator generating a modulation signal of fixed frequency, and angle modulators which provide angle modulation, such as frequency or phase modulation, of said carriers by using the modulation signal. On the other hand, the receiver receives the angle modulated signals reflected from the object, and detects tuning distortion, such as, amplitude distortion or phase distortion, of the received signals through such as detecting means as an envelope detector or frequency discriminator. In other words, the receiver used in the system of this invention is used to detect the presence or absence of an object, its kind and number, through detection of amplitude distortion or phase distortion of the received signal.

The primary object of this invention is to provide an object identification system for objects whose identification capacity is markedly large.

Another object of this invention is to provide an object identification system which allows the reception of signals by a receiver with a sufficiently high $S/N$ ratio for the fluctuation of the receiving signals due to vibration of the object itself or the fluctuation of the transmitting signal levels These and further objects, construction and effect of this invention will be more clearly understood from the following detailed description of preferred embodiments of the invention, reference being had to the accompanying drawings, in which:

EMBODIMENT I

Figure 1A:
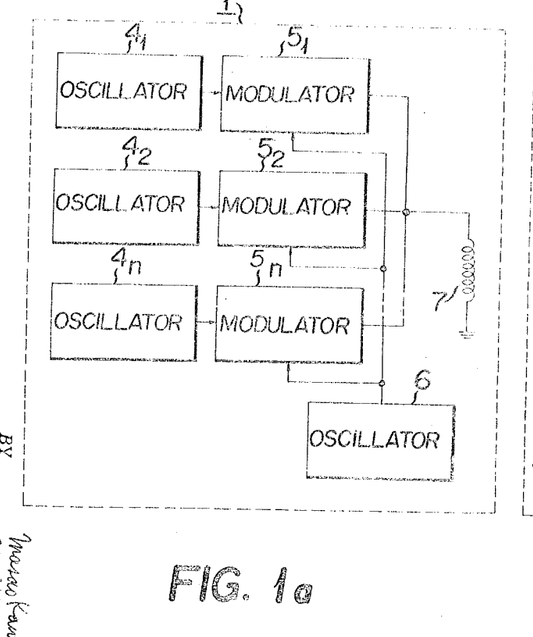
FIGS. 1a to 1c inclusive are block diagrams showing the construction of one embodiment of this invention.

In FIG. 1, a transmitter 1 comprises $n$ carrier oscillators $4_1$–$4_n$ which oscillate $n$ frequencies whose angular frequencies are $\omega_1, \omega_2, \ldots \omega_n$, respectively, each frequency composing one channel. Accordingly, the transmitter consists of $n$ channels. This number $n$ depends upon the number of objects and the type of codes used for object identification. If, for example, the number of the objects is two digits and the code is 1–2–4–7, then the number $n$ is 8 based upon the following correspondence.

| 1st order | | 2nd order | |
|---|---|---|---|
| 1 | $\omega_1$ | 10 | $\omega_5$ |
| 2 | $\omega_2$ | 20 | $\omega_6$ |
| 4 | $\omega_3$ | 40 | $\omega_7$ |
| 7 | $\omega_4$ | 70 | $\omega_8$ |

Frequency (or phase) modulators $5_1$–$5_n$, as angle modulators, are provided corresponding to and in one piece of the carrier oscillators $4_1$–$4_n$.

The modulation signal oscillator 6 furnished with a repetition frequency $\omega_m$, which may be either a sine wave or a general cyclic frequency, 7 is a transmitting antenna.

Figure 1B:
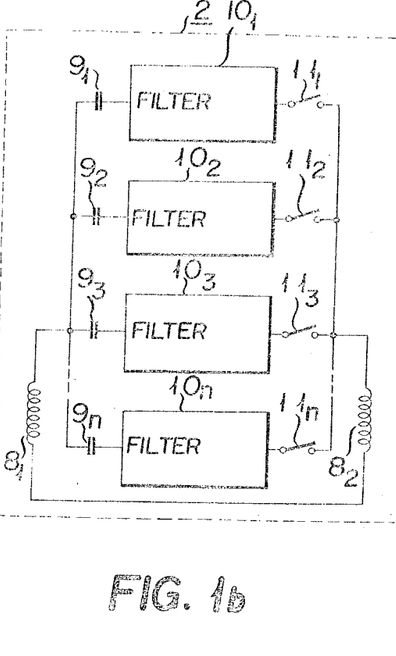

In FIG. 1b, the reference numeral 2 indicates a response device having receiving antennas $8_1$ and $8_2$ and tuning condensers $9_1$–$9_n$. Response filters $10_1$, $10_2$ ... $10_n$ make specific functions against electromagnetic waves, as will be stated later. Selection of such electromagnetic waves is effected by switches $11_1$, $11_2$ ... $11_n$, while setting of the kind or number of the object is made by turning some of these switches to "ON" according to corresponding codes.

Figure 1C:
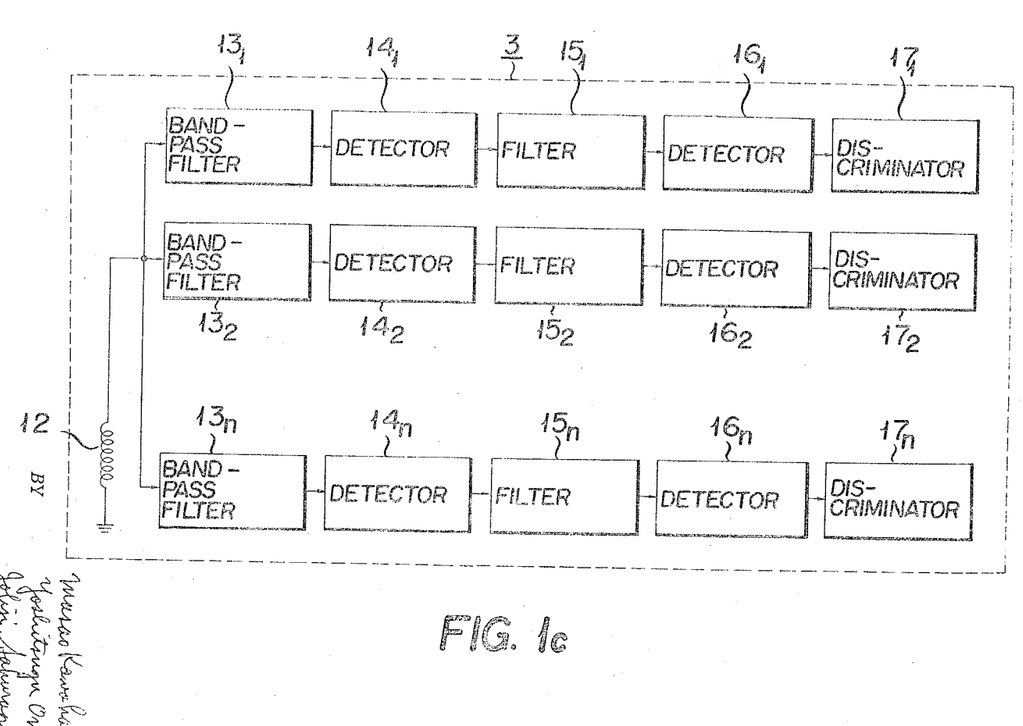

In FIG. 1c, 3 indicates a receiver and 12 a receiving antenna. Bandpass filters $13_1$–$13_n$ have center angular frequencies of $\omega_1$–$\omega_n$, thus distributing the received electromagnetic waves into each channel (each frequency component). Detention is effected by envelope detectors $14_1$–$14_n$. Bandpass filters $15_1$–$15_n$ have a center frequency of $2_m$ (namely, twice the modulation frequency). In the figure, $16_1$–$16_n$ are envelope detectors. $17_1$–$17_n$ are code discriminators, each consisting of an amplitude discriminator and a timing discriminator. Namely, if a signal whose level exceeds a certain prefixed level continues to run in a duration longer than a preset time, it is judged as "1"; and "0" for other cases. To be concrete, a Schmitt trigger circuit and a Schmitt trigger circuit following an integrating circuit are used, respectively, as the amplitude discriminator and the timing discriminator.

Assuming that the transmitter 1 sends out $n$ carrier frequencies $\omega_1$, $\omega_2$ ... $\omega_n$ whose repetition frequency is $\omega_m$ and which has been frequency-modulated at a peak angular frequency deviation of $\Delta\omega$, the FM signal, as is well known, can be expressed by:

$$F(A) = A \sin\left(\omega c t + \int_0^t \mu(t)dt\right) \quad (1)$$

where $\mu(t)$ is a modulation signal (for example $\omega \cos \omega_n$); A is a carrier amplitude, $\omega_c$ is a carrier angular frequency, $\Delta\omega$ is peak angular frequency deviation, and $\omega_m$ represents a modulation angular frequency.

If such FM signal is supplied to a response tuning circuit whose frequency amplitude characteristic is $G(\omega)$ and frequency-phase characteristics is $\phi(\omega)$, then the output under sub-normal condition is $$F(t) = AG\{\omega_C + \mu(t)\} \sin\left\{\omega c t + \int_0^t \mu(t)dt + \varphi(\omega c + \mu(t))\right\}$$

where $\quad (2)$
$\omega = \omega C + \mu(t)$.

Then if this output is detected by the envelope detector, it is:

$$f(t) = AG\{\omega c + \mu(t)\} \quad (3)$$

Now if $G(\omega)$ undergoes Tailor expansion at an angular frequency of $$G(\omega) = a_0 + a_1(\omega - \omega_r) + a_2(\omega - \omega_r)^2 + a_3(\omega - \omega_r)^3 + \ldots$$

where $\quad (4)$ $$a_0 = G(\omega_r), \quad a_1 = \left[\frac{d}{d\omega}G(\omega)\right]_\omega = \omega_r$$

$$a_2 = \frac{1}{2!}\left[\frac{d^2}{d\omega^2}G(w)\right]_\omega = \omega_r, \quad a_3 = \frac{1}{3!}\left[\frac{d^3}{d\omega^3}G(\omega)\right]_\omega = \omega_r$$

If $\omega_c = \omega_r$, $F(t)$ can be expressed as follows, from the above Equations 3 and 4.

$$f(t) = A\{a_0 + a_1\mu(t) + a_2\mu(t)^2 + a_3\mu(t)^3 + \ldots\} \quad (5)$$

where the amplitude characteristic ($G\omega$) of the response tuning circuit is linear to $\omega$ of Equation (5), the terms above the second degree term do not appear. In case $G(\omega)$ is non-linear to $\omega$, Equation 5 generally becomes an infinite series. In other words, the presence or absence of the terms above second degree term in $f(t)$ of Equation 5 depends upon whether $G(\omega)$ is linear or non-linear to $\omega$.

By utilizing this principle for the FM signal as received, whether the FM signal has passed through the center or band or band edge of the tuning curve can be discriminated without using the difference in attenuation of the receiver.

Figure 2:
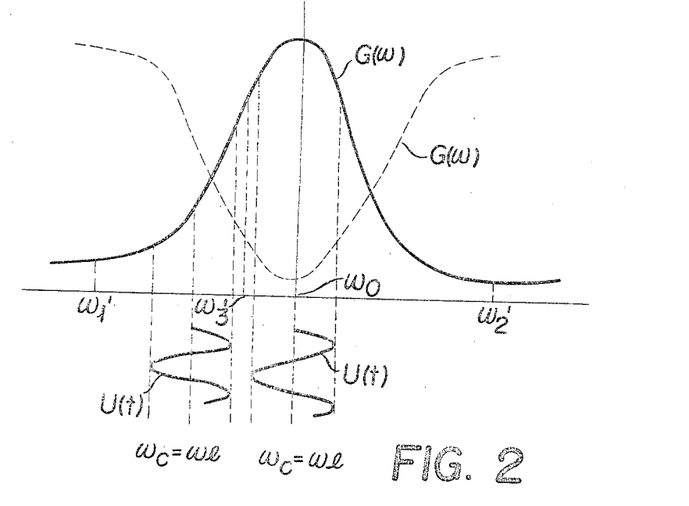
FIG. 2 is a tuning curve of a response tuning circuit to explain the function of the response device shown in FIG. 1.

Now assuming that the frequency amplitude characteristic of the response tuning circuit be as shown in FIG. 2. Then if $G(\omega)$ is expanded near $\omega_0$, the second degree term is predominant. Namely, $$/a_1/ \ll /a_2/ \quad (6)$$

If $a_2$ in this case is $A_2$, then $$A_2 = \frac{1}{2!}\left[\frac{d^2}{d\omega^2}G(\omega)\right]_\omega = \omega_c = \omega_0 \quad (7)$$

Also, in case $G(\omega)$ is expanded at a point apart from $\omega_0$, say, near $\omega_0 = \omega_1 - 1$ in FIG. 2, the term of the first degree becomes predominant. Namely, $$|a_2| > |a_3| \ll |a_1| \quad (8)$$

If $a_2$ in this case is $A_2$, then $$A_2' = \frac{1}{2!}\left[\frac{d^2}{d\omega^2}G(\omega)\right]_\omega = \omega_{1-1} \gtrless \omega_0 \quad (9)$$

It is possible to design the response tuning circuit to have the following relation:

$$|A_2'| \ll |A_2| \quad (10)$$

Consequently, Let us have an eye to the term of the second degree ($a_2$). If the modulation signal $\mu(t)$ is of single sine waveform and $\mu(t) = \Delta\omega \cos \omega_m t$, the output $f(t)'$ when the signal shown in Equation 5 is passed through the bandpass filter whose center frequency is $2\omega_m$ can be expressed by the following equation.

$$f(t)' = \frac{a_2 \Delta\omega^2}{2} \cos 2\omega_m t \quad (11)$$

If this $f(t)'$ is further detected by the envelope detector, the output $f(t)''$ is:

$$f(t)'' = \frac{\Delta\omega^2}{2} a_2 \quad (12)$$

From Equation 7, the output $f(t)''$ when it passes through near the center of the bandpass filter is:

$$[f(t)'']\omega_c = \omega_0 = \frac{\omega^2}{2} \cdot \frac{1}{2!}\left[\frac{d^2}{d\omega^2}G(\omega)\right]_\omega = \omega_0 \quad (13)$$

From Equation 9, the following relation can be obtained as the output passes through the band or hand edge of the tuning characteristic curve of the response tuning circuit.

$$[f(t)'']_0 \gtrless_0 = \frac{2}{2} \cdot \frac{1}{2!}\left[\frac{d^2}{d\omega^2}G(\omega)\right]_\omega \gtrless \omega_0 \quad (14)$$

Therefore, if two carrier frequencies whose angular frequencies are $\omega_1$ and $\omega_2$ are considered with the signal and noise (leak) being taken as $\omega_1 = \omega_0$ and $\omega_2 \neq \omega_0$, respectively, then the $S/N$ ratio for $f(t)''$ is:

$$S/N = \left[\frac{d^2}{d\omega^2}G(\omega)\right]_\omega = \omega_1 \Big/ \left[\frac{d^2}{d\omega^2}G(\omega)\right]_\omega = \omega_2 \quad (15)$$

This $S/N$ ratio can be increased as desired, by making linear the characteristic of $G(\omega)$ when $\omega = \omega_0$. That is, whether the signal has passed through the center or band edge of the tuning characteristic curve can be detected.

According to this invention, the angle, i.e., phase-angle modulated signal distorted and reflected from the response device is received by the receiver 3, and the signal is dected by angular frequencies with the envelope detectors $14_1$–$14_n$ via the first bandpass filters $13_1$–$13_n$. Then the output is taken out via the second bandpass filters $15_1$–$15_n$ that can make pass frequencies which are twice the modulation frequency, namely $2m$.

Description will now be made to the process in which a receiver 3 correctly makes the detection of signals in case that, among the switches $11_1$, $11_2$ ... $11_n$, only the switch $11_1$ is "ON" and the others are "OFF." The FM signal to be received by the receiver 3 is the one passing through the tuning circuit $10_1$ alone within the response device 2. In this case, only the angular frequency $\omega_1$ passes through the center of the tuning curve of the response tuning circuit $10_1$, while the other angular frequencies $\omega_2, \omega_3 \ldots \omega_n$ is expressed as follows, from Equations 12 and 14.

$$[f(t)']\omega_0=\omega_2\sim\omega_n=\frac{\Delta\omega^2}{2}\frac{1}{2!}\left[\frac{d^2}{d\omega^2}G(\omega)\right]=\omega_2\sim\omega_n \quad (17)$$

As is clear from the process introducing Equation 15, it is possible to increase the ratio of Equation 16 to Equation 17 as desired, dependent upon the characteristic of the response filter $10_1$. Therefore, the fact that switch $11_1$ is "ON" while the other switches are "OFF" can be detected at an $S/N$ ratio as high as desired.

Figures 3A, 3B:
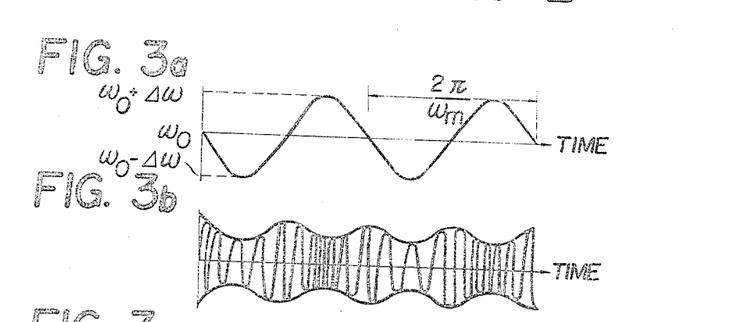
FIGS. 3a to 3c inclusive show waveforms of signals angle-modulated and demodulated in each circuit of the system shown in FIG. 1.
Figure 3C:
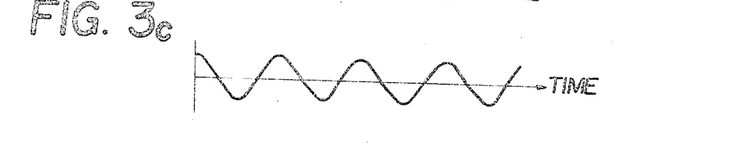

FIG. 3 illustrates waveforms of signals at the major parts of the invention as applied by way of example. FIG. 3a shows changes with varying time of instantaneous angular frequencies transmitted from the transmitter to the object, while FIG. 3b shows waveforms of the signal immediately after having passed through the center of the tuning characteristic curve of the tuning circuits provided in the object. The aforementioned specific function means such amplitude modulation as shown in the drawing. FIG. 3c shows waveforms of the frequency of FIG. 3b which has been detected by the envelope detector. As is evident when FIG. 3a and FIG. 3c are compared with each other, the repetition frequency of FIG. 3c is twice that of FIG. 3a. In other words, if the repetition frequency of FIG. 3a is $m$, that of FIG. 3c is $2m$.

Figures 4, 10:
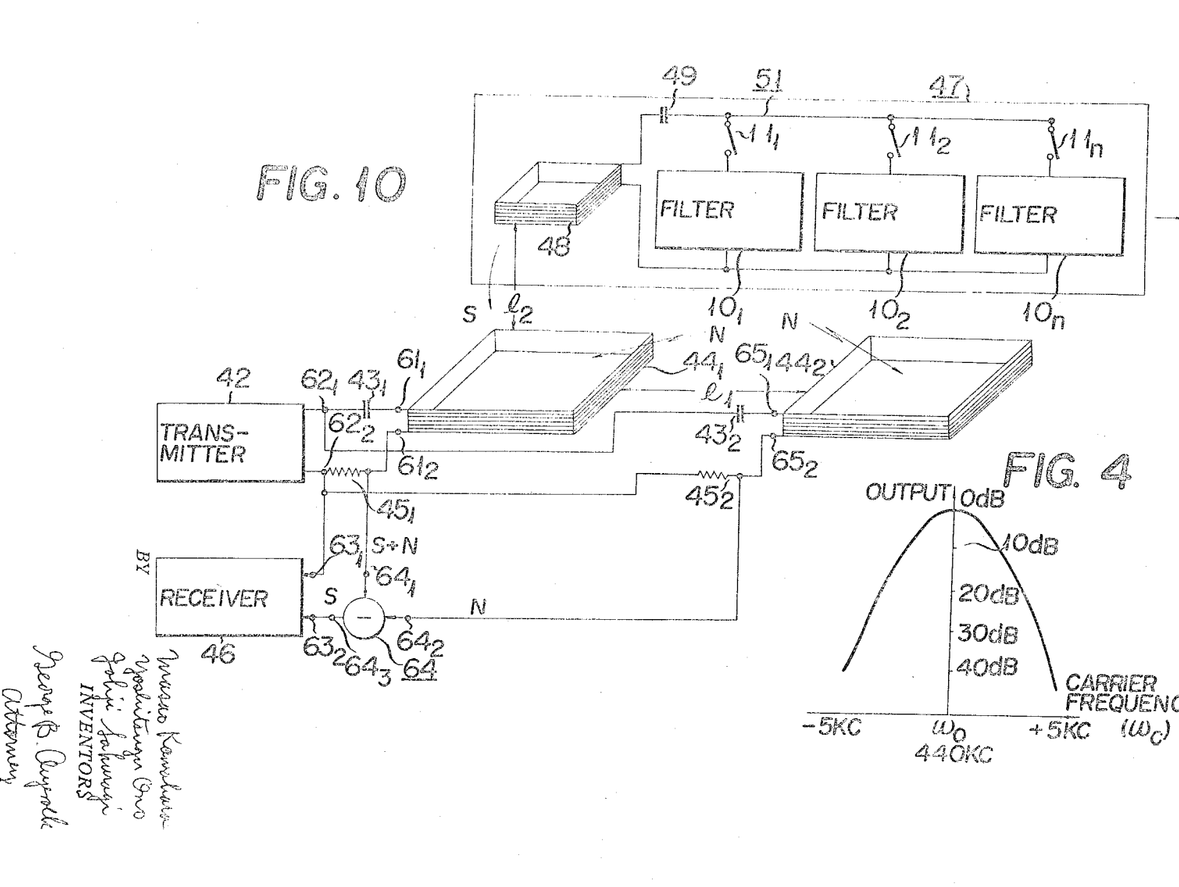
FIG. 4 shows a curve of the relation between receiving outputs and frequency response of the receiver shown in FIG. 1.
FIGS. 8 to 11 inclusive are block diagrams of further modifications of the invention.

FIG. 4 illustrates actually measured values of the frequencies of the receiver of the invention as applied. They are effective values of outputs of the envelope detectors $16_1$ on the conditions that, in the transmitter 1, the oscillated angular frequency $\omega_1$ of the carrier oscillator $4_1$ is 440 kc., the carrier oscillators $4_2$–$4_n$ are set at "OFF," the frequency of the modulation signal oscillator 6 is 500 c./s.; in the response device 2, the switch $11_1$ alone is "ON," the other switches $11_2$–$11_n$ are all set at "OFF," piezo resonant elements whose resonance frequency is 440 c./s. are used as tuning circuits; and in the receiver 3, the first bandpass filter $13_1$ has a center frequency of 440 kc., the second bandpass filter $15_1$ has a center frequency of 1 kc., envelope detectors $14_1$ and $16_1$ are used, and the oscillation frequency $\omega_1$ of the carrier oscillator $4_1$ is made changed in the range 440 kc.±5 kc. From that figure, it is possible to provide a selectivity of more than 40 db against the frequencies other than $\omega_1$ if the channel interval is set at 5 kc. or more. Thus, more than 20 db improvement can be realized as compared when only the attenuation of the selectivity of the response tuning circuit $10_1$ is utilized.

According to this invention, it is easy to increase the S/N ratio to 40 db or more. If such an S/N ratio can be maintained, stable code detection can be made even though the margin for the fluctuation of the object is subtracted. Consequently, one of the advantages this invention offers is a higher resistance of the device to fluctuations of the object.

Incidentally, it is also possible to use a mechanical resonator such as a lead selector as the means of detecting a signal twice the modulation frequency.

Figure 5:
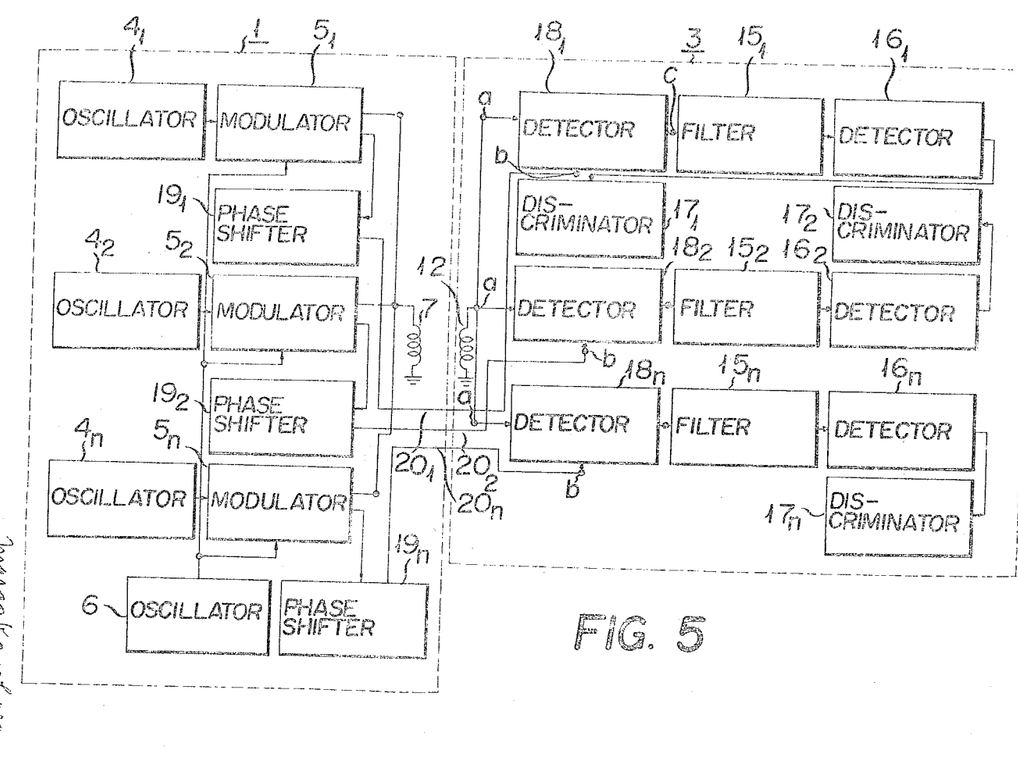
FIG. 5 is a block diagram illustrating a variation of the circuit shown in FIG. 1.

In the embodiment given above, the receiver uses the bandpass filters $13_1$–$13_n$ and the envelope detectors $14_1$–$14_n$. These may be replaced with synchronization detectors $14_1$–$14_n$. These may be replaced with synchronization detectors, as shown in FIG. 5. In FIG. 5, the output from the receiving antenna 12 of the receiver 3 is supplied to the first input terminal $a$ of the $n$ synchronization detectors $18_1, 18_2 \ldots 18_n$ corresponding to the $n$ angle modulated signals $f1$–$fn$ that are transmitted from the transmitter 1. Such synchronization detectors may also be replaced with such common detectors as balanced modulators or ring modulators. In the transmitter 1 on the other hand, the output of each angle modulator $5_1$–$5_n$ is taken out via phase shifter $19_1$–$19_n$, then is introduced to the receiver 3 through conductors $20_1$–$20_n$ and is supplied to the second terminal $b$ of the aforementioned synchronization detectors $18_1$–$18_n$ corresponding to them.

In the receiver of such a construction 3, several specific signals among the carrier signals from the transmitter 1 which are reflected at the response device 2 (not shown in the figure) are supplied at the same time to the input terminal $a$ of each synchronization detector $18_1$–$18_n$. On the other hand, the output from each angle modulator of the transmitter 1 is supplied to the second input terminal of each synchronization detector. As a result, an output appears at the output terminal $c$ of the synchronization detector only when the angle modulator output accords with that frequency. To explain more fully, when the frequencies of the signals introduced to the first and second terminals $a$ and $b$ agree with each other, and when their phase is 0° or 180°, either one of the envelope signals can be taken out as a maximum output at the output terminal $c$ of the synchronization detector.

The phase shifters $19_1$–$19_n$ are used for making the carrier signals supplied at the first and second input terminals of the synchronization detectors agree in phase.

In consideration of the terms above the second degree term of Equation 4, it is not always necessary to provide the change near the center of the amplitude characteristic $G(\omega)$ with a quadratic function but it may be a solid function. In this case, too, the center frequency of the second bandpass filter may be either one of $3m, 4m, \ldots nm$ ($n$: integral numbers higher than 3). Moreover, the bandpass filter may be a high bandpass filter if it can pass more than $2m$ frequencies.

In the above embodiment, explanation has been given in the case where the FM signal shown in Equation 1 is used. If this Equation 1 is rewritten as follows, no contradiction will take place in the explanation on and after Equation 2.

$$F(t)=A \sin (\varpi_0 t+\mu(t)) \quad (1)'$$

Figure 6:
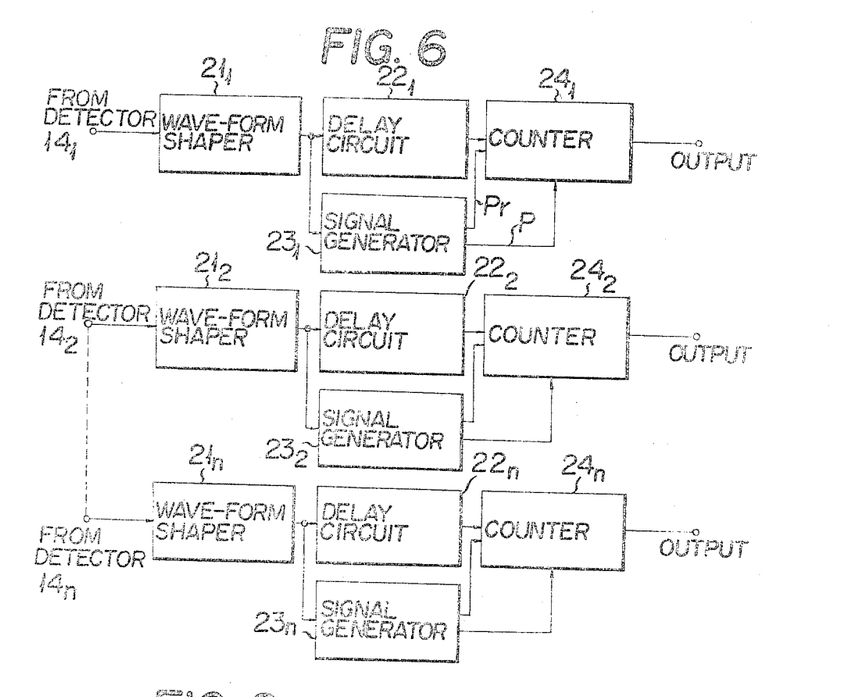
FIG. 6 is a block diagram showing a varation of the receiver of the system shown in FIG. 1.

This equation shows waveforms phase-modulated by modulation signal $\mu(t)$. Consequently, the above embodiment is also feasible if phase-modulated signals are used as media. As a variation of the above embodiment, the receiver shown in FIG. 1 or FIG. 2 may be altered in composition to a circuit as shown in FIG. 6. Namely, the bandpass $f$ filters $15_1$–$15_n$, envelope detectors $16_1$–$16_n$ and code discriminators $17_1$–$17_n$ in FIG. 1 or 2 can be replaced with, respectively, the waveform shapers $21_1$–$21_n$, delay circuits $22_1$–$22_n$, reset signal and gate signal generators $23_1$–$23_n$, and counters $24_1$–$24_n$. The functions of this replacement receiver will be described on the assumption that Equation 6 is established. If the assumption of Equation 6 is established, the signal having passed through the center of the tuning characteristic curve of the tuning circuit is detected by the detectors $14_1$–$14_n$ to have an angular frequency of $2m$. On the other hand, the signal having passed through the band of the curve is also detected by the same detectors $14_1$–$14_n$ to have an angular frequency of $\omega m$. If $T=2n/m$, the signal whose angular frequency is $2m$ has $2n$ crests, while that of $\omega m$ has $n$ crests. By utilizing this fact, it can be easy to discriminate the above two frequencies. In FIG. 6, the output (sine wave) from the detectors $14_1$–$14_n$ is applied to waveform shapers, say, Schmitt trigger circuits $21_1$–$21_n$, of which one is supplied to delay circuits, say, mono-stable multivibrators $22_1$–$22_n$ and the other to gate signal oscillators $23_1$–$23_n$. These oscillators may, for example, be such that each one may be a mono-stable multivibrator which oscillates negative (or positive) square waves in the duration $T=2n/m$. A reset signal Pr can be obtained by utilizing the start (or end) of these square waves. The counters $24_1$–$24_n$ are operated by the gate signal in the duration $T=2n/m$. Each counter is so constructed as to allow counting of $2n$ digits. Accordingly, because of the final stage output of this counter, the wave whose angular frequency is $m$ does not appear as output while that of $2m$ can be obtained as output.

EMBODIMENT II

In the embodiment shown in FIG. 1, it is also possible to more simplify the receiver by using the elements from bandpass filters $13_1$–$13_n$ to code discriminators $17_1$–$17_n$ in common. The bandpass filters are used for the electromagnetic waves received into respective frequency components namely, for channel separation. But the same function may be realized by sending out the time division $n$ frequencies emitted from the transmitter 1 and by making them received by the receiver 3 by synchronization.

Figure 7:
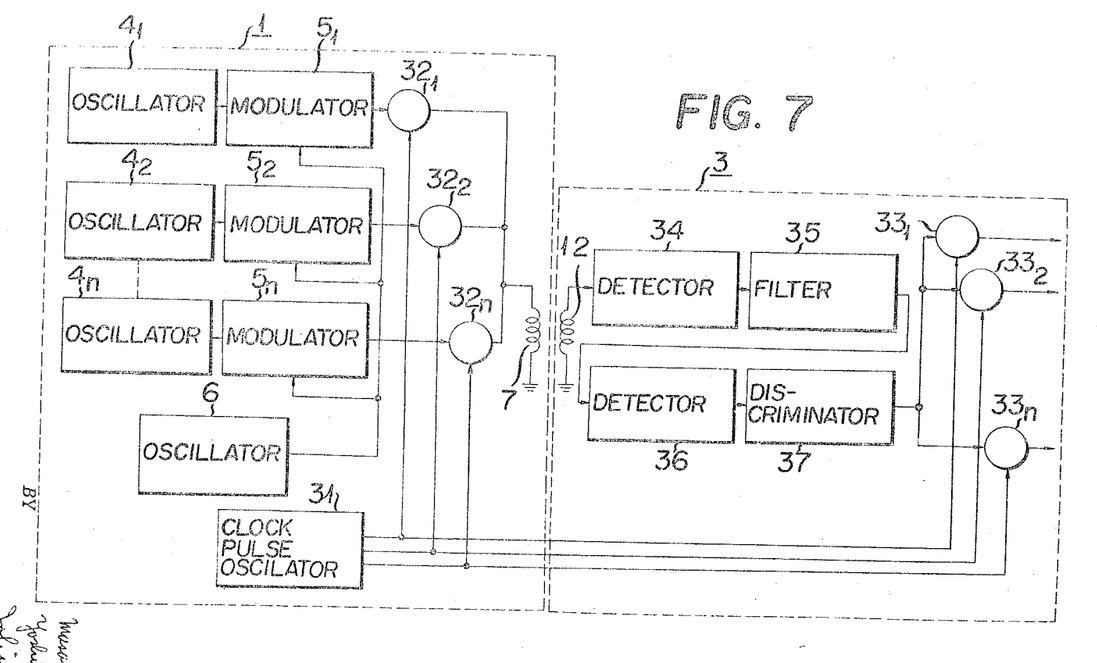
FIG. 7 is a block diagram of a modification of this invention.

In this case, it becomes unnecessary to use bandpass filters $13_1$–$13_n$. FIG. 7 shows a block diagram of the invention as applied by way of the second embodiment to realize the above-mentioned purpose. In this figure, the parts corresponding to those in FIG. 1 are provided with the same reference numerals and their explanation is omitted while the response device 2 is not furnished in the drawing because of the same type as shown in FIG. 1.

The clock pulse generator 31 oscillates $n$ kinds of clock pulses whose phase deviates step by step. $32_1$–$32_n$ and $33_1$–$33_n$ are gate circuits.

The first gate circuits $32_1$–$32_n$ are connected in the respective paths between the transmitting antenna 7 and modulators $5_1$–$5_n$ of the transmitter 1, thus supplying the antenna with time-division modulator outputs. These gates need not always be connected in the positions shown in the drawing but may be connected either between the modulation frequency generator 6 and respective modulator $5_1$–$5_n$ or between these respective modulators and carrier signal oscillators $4_1$–$4_n$. The receiver 3 consists of a series circuit composed of the first envelope detector 34 connected to the receiving antenna 12, bandpass filter 35 whose center frequency is $2\omega m$, second envelope detector 36, and code discriminator 37; and the $n$ second gate circuits $33_1$–$33_n$ connected in parallel with the output terminal of the above series circuit. A couple of gates corresponding to each other of the first and second gate circuits are synchronously switched on and off by the clock pulse oscillator 31. The receiver of such construction is markedly simplified and economical. The envelope detector 34 of this receiver is originally provided with wide band characteristic but must of course be designed to operate for all carrier signals $\omega_1$–$\omega_n$. Furthermore, this receiver can offer a better $S/N$ ratio than the one in the first embodiment, because no bandpass filter is needed resulting in the freedom from distortion arising from such bandpass filters.

If the circuits including the bandpass filter 35, envelope detector 36 and code discriminator 37 are replaced with the waveform shaper, delay circuit, reset signal and gate pulse generator and counter as shown in FIG. 6, the receiver can offer much better $S/N$ ratios because no filter is used at all.

EMBODIMENT III

Figures 8, 12A, 12B:
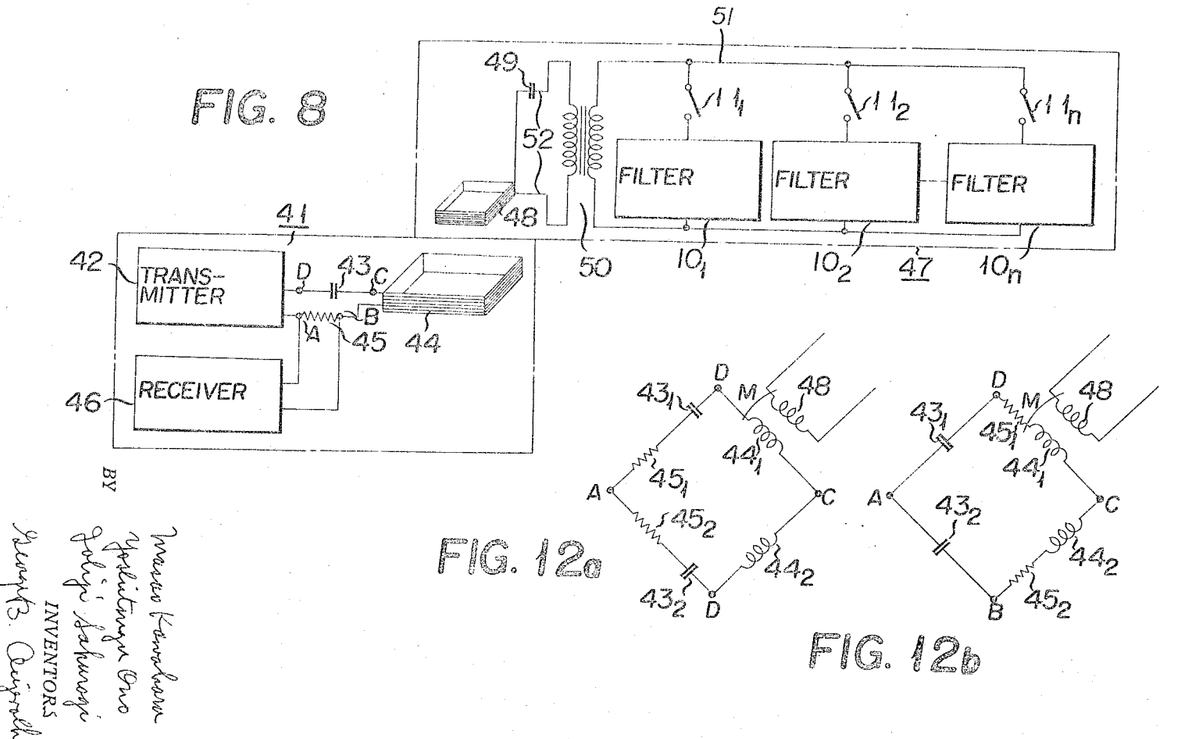
FIGS. 12a and 12b are connection diagrams of variations of the bridge circuit shown in FIG. 11.

In the above-mentioned two embodiments, a pair of antennas, for transmitting and receiving signals, should be provided on the object and the ground transmitter/receive respectively. This invention as applied by way of the third embodiment is to provide the means of identifying the object in which stable and current detection of signals can be realized by using only one antenna system with the object and the transmitter/receiver, respectively. FIG. 8 illustrates a general block diagram of this third embodiment. The ground equipment contains a transmitter 42 (corresponding to 1 in FIG. 1) which sends out signals FM-modualted by $\omega_m$. The output terminal of this transmitter 42 is connected to the transmitting antenna 44 via the condenser 43; the antenna is set with the condenser so that they resonate with each other at a nearly center frequency of the aforementioned FM waves. Also connected in series to the antenna 44 is a damping resistor 45, both ends of which are connected to the input terminals of the receiver 46 (corresponding to 3 in FIG. 1). Accordingly, it is found that the antenna 44 corresponds to and acts as both the transmitting antennas 7 and receiving antenna in in FIG. 1. In the object 47, the response antenna 48 is provided which is connected to the transmitting antenna 44. Thus the response antenna 48, together with the transmitting antenna 44, forms a resonance circuit which resonates with the center frequency of the aforementioned FM waves. It is connected to the primary of the transformer 50 via a condenser 49, while the number discriminating system 51 is connected to the secondary of the transformer 50. The antenna 48 corresponds to the transmitting antenna 81 and receiving 82 antennas of the response device in FIG. 1. The number of discriminating system 51, like that in FIG. 1, consists of response tuning circuits $10_1$–$10_n$, composed of piezo resonators, connected in parallel via the number setting switches $11_1$–$11_n$, wherein the number of the object 47, i.e., a combination of frequencies, is set by selectively turning off the said switches $11_1$–$11_n$.

Figure 9:
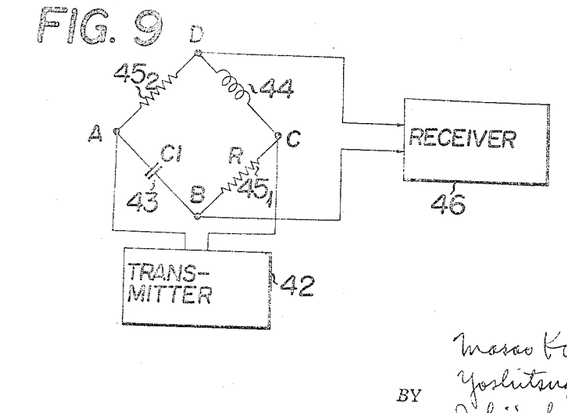

In that drawing, 52 is the cable connecting the response antenna 48 with the response transformer 50. The receiver 46 of the ground equipment 41 need not always be connected to between both ends A and B of the resistor 45, but may also be connectable between A and D, A and C, or B and D. The damping resistor 45 not only serves to damp the Q-value of the transmitter antenna 44 but is set so that the resistance may be nearly equal to the impedance of the cable connecting the transmitter 42—between A and D, and between A and B—to the receiver 46. The response transformer 50 is so set that the series resistance of the response tuning circuits $10_1$–$10_n$, if viewed from its winding side, may be $1/n^2$ equivalently, thereby increasing the level of current $I_2$ running through the response antenna 48 higher than in case of transformer 50 being not equipped. The function of the said system will be described below. $n$ carrier frequencies $\omega_1, \omega_2 \ldots \omega_n$ angle-modulated by the modulation frequency $\omega_m$ are transmitted from the transmitter 42 through the antenna 44. When the object 47 passes by over the antenna 44, carrier signal voltages are induced in the response antenna 48 by electromagnetic induction. Of these $n$ carrier signals, those which resonate with the response tuning circuits which have been set by the number discriminating system 51 are subject to amplitude distortion as stated previously. The signals thus having had amplitude distortion are again introduced into the antenna 44 via the antenna 48 and are taken out in the receiver 46 through both ends of the resistor 45. Then the receiver detects the distortion of the carrier signals received, say, a frequency component of $2\omega_m$, by way of the means mentioned in the quoted examples, thus discriminating the object having passed through over the transmitting antenna. FIG. 9 shows a variation of the said modification, wherein the transmitter 42 and receiver 46 of the ground equipment are connected to the terminals of the bridge circuit, respectively.

In FIG. 9, the similar parts as those shown in FIG. 8 are given the same numerals. The bridge circuit consists of the condenser 43, transmitting antenna 44, and damping resistors $45_1$ and $45_2$ which are connected in the respective arms of the bring circuit. The output from the transmitter 42 is supplied to opposite points A and C. This output, as mentioned previously, contains angle-modulated carrier frequencies; the elements of the respective arms are selected so that the bridge may be balanced for such carrier frequencies. For this reason, no carrier signal output appears between the second opposite B and D of the bridge, to which the input signal terminal of the receiver 46 is connected.

However, when the object 47 passes through over the transmitting antenna 44 of the ground equipment 41, this antenna and the response antenna 48 on the object are electromagnetically coupled with the result that the bridge gets unbalanced and that the potential between terminals B and D has a distortion component of $2\omega_m$ thereby identifying the object.

One of the features of this embodiment is that only one pair of antennas are needed and therefore this embodiment is completely free from trouble arising from mutual induction of antenna systems. This feature enables the floor space of the equipment to be minimized and its installation to be very easy if the object is a motor car, a locomotive or any other vehicles.

EMBODIMENT IV

By still improving the principle of operation used in the above third embodiment, it is possible to provide the receiver with a far better $S/N$ ratio. In embodiments I through III, the $S/N$ ratio means a ratio of the signal having passing near the center frequency of the response tuning circuit to a signal having passing through a point apart from the center frequency. And these signals are transmitted from the transmitter. However, it is needless to mention that noise includes external noise coming from other sources. If the object is an electric train, for example, noise will be generated from the various electrical components on the train.

Figure 11:
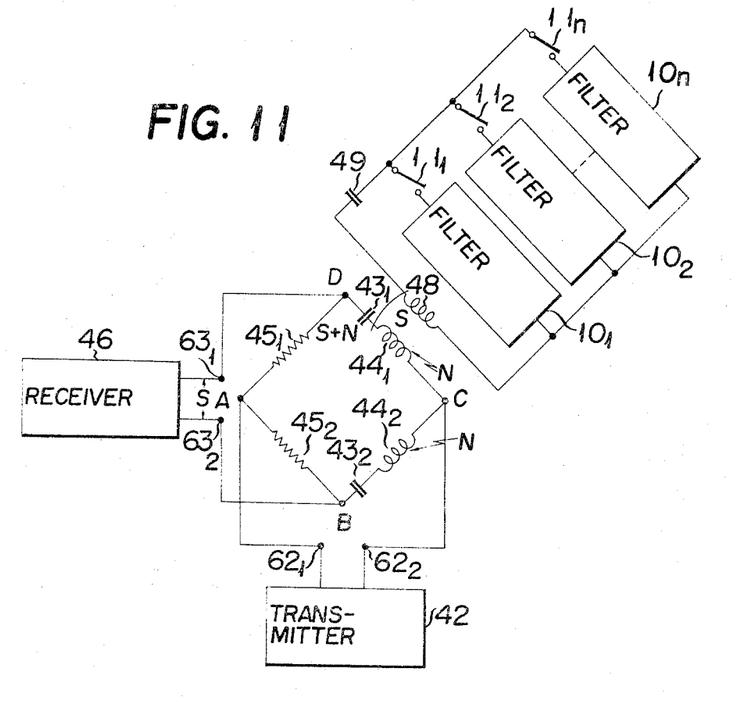

The embodiment shown in FIGS. 10 through 12 is to provide a receiver which can suppress such noise including external noise. FIG. 10 is an overall block diagram of the invention as applied by way of this fourth embodiment, wherein the parts corresponding to those in FIG. 8 are provided with the similar numerals. On the railway on which the object passes there are furnished the first and second transmitting/receiving antennas $44_1$ and $44_2$, which are connected to the transmitter 42 and receiver 46, respectively, as in the case of the mechanism in FIG. 8. In other words, the winding terminals $61_1$ and $61_2$ of the transmitting/receiving antenna 44 are connected to the output terminals $62_1$ and $62_2$ of the transmitter 42 via a condenser $43_1$ and a resistor $45_1$, respectively. One end $62_1$ of the resistor $45_1$ is connected to one end $63_1$ of the input terminals of the receiver 46, while the other end $61_2$ of the resistor $45_1$ is connected to the in input terminal $64_1$ of the differential circuit 64. The winding terminals $65_1$ and $65_2$ of the second transmitting/receiving antenna $44_2$ are connected to the output terminals $62_1$ and $62_2$ of the transmitter 42 via a condenser $43_2$ and a resistor $45_2$, respectively. One end $62_2$ of the resistor $45_2$ is connected to one input terminal $63_1$ of the receiver, and the other terminal $65_2$ to the other terminal $64_2$ of the differential circuit 64. This differential circuit 64 sends out to the output terminal $64_3$ a differential signal between the signals supplied to the input terminals $64_1$ and $64_2$. The output terminal $64_3$ is connected to the other input terminal $63_2$ of the receiver 46.

The system shown in 47 in the drawing is the response device located in the object, the explanation of which is omitted because it has nearly similar construction as the system given in FIG. 8.

The first and second transmitting/receiving antenna $44_1$ and $44_2$ are arranged with a mutual distance of $1_1$ along the railroad. This distance $1_1$ must be such that, when the response antenna 48 in the object is electromagnetically connected to either one of the first and second antennas $44_1$ and $44_2$, its connection may be negligible for the other antenna. Accordingly, the distance $1_1$ is to be much longer than the distance $1_2$ between both antennas when the object is coupled to either one of the antennas. If the response device 47 in the object shifts in direction of the arrow over the transmitting receiving antennas $44_1$ and $44_2$ which have been so arranged, the response antenna 48 gets coupled to the first and second antennas in that order.

Now supposed that the response antenna 48 is coupled to the first transmitting/receiving antenna $44_1$, as shown, the signal S from the response device 47 is received by the antenna $44_1$ only. Since, however, external noise generally comes from places fully apart from the antennas $44_1$ and $44_2$ and also since the wavelength of external noise signals is sufficiently larger than the distance $1_1$ between the two antennas, it may be considered that the phases of the noise signal voltages induced in the first and second transmitting/receiving antennas are equal to each other. For this reason, the signal voltage S and noise voltage N are induced in the first antenna $44_1$, while only the noise voltage N is induced in the other antenna $44_2$. The voltages thus produced in the two antennas are applied to the differential circuit 64, where their difference output is taken out (namely, $(S+N)-N=S$)

On the other hand, only the signal voltage S is taken out at the output side. As the two transmitting/receiving antennas are arranged in parallel with each other in the direction in which the object runs, it is possible to obtain two chances of identifying the same object if it is so designed that the response antenna 48 is coupled to the first transmitting/receiving antenna $44_1$ and then the other $44_2$. Thus by providing the code indicating the number or such of the object with a margin, it becomes possible to reduce mis-identification thereby improving the performance.

FIG. 11 illustrates the concrete circuit configuration of the differential circuit 64 shown in FIG. 10. In the figure, the similar parts as in FIG. 10 are identified the same reference numerals. The bridge circuit in FIG. 11 replaces the differential circuit 64 in FIGURE 10. The two arms $\overline{CD}$ and $\overline{BC}$ of this bridge are composed of the first and second transmitting/receiving antennas $44_1$ and $44_2$, and the series condensers $43_1$ and $43_2$, respectively, while the other two adjacent arms are composed of the resistors $45_1$ and $45_2$, respectively. The output terminals $62_1$ and $62_2$ of the transmitter 42 are connected to between the first facing points A and C of the bridge, while the input terminals $63_1$ and $63_2$ of the receiver 46 are connected to between the second facing terminals B and D.

The construction of the bridge need not necessarily be such one as shown in the drawing, but it should correspond to the arrangements of elements composing the respective arms. In either case, however, the bridge circuit must be so adjusted that it may be nearly balanced against the carrier signals transmitted from the transmitter.

Detailed description of the transmitter and receiver in the third and fourth embodiments has been omitted, but it may be the same equipments as mentioned in the first and second embodiments or a combination of them.

There is a variation of the invention common to the Embodiments I through IV, which is as follows: The variation is to provide the means of detecting signals by using their phase distortion, though in the other embodiments such is done by utilizing the amplitude distortion of signals as expressed in Equation 2.

Now let's examine the following term showing the phase distortion in Equation 2.

$$\varphi\{\omega_c+\mu(t)\} \qquad (18)$$

If this signal (Equation 2) is frequency-discriminated by an ideal limiter and its output is $f(t)_{FM}$, then;

$$f(t)_{FM} = \frac{d}{dt}(\omega_c t) + \int_0^t \mu(t)dt + \varphi\{\omega_c+\mu(t)\}$$

$$= \omega_c + \mu(t) + \frac{d}{dt}\varphi\{\omega_c+\mu(t)\} \qquad (19)$$

where, $$f(t)_{FM} = \frac{d}{dt}\varphi\{\omega_c + \mu(t)\} \quad (20)$$

Then if $\varphi(\omega)$ and $\omega = \omega_c + \mu(t)$ are Taylor developed at point $\omega_r$, $$\varphi(\omega) = b_0 + b_1(\omega - \omega_r) + b_2(\omega - \omega_r)^2 + b_n(\omega - \omega_r)^n \quad (21)$$

where, $$b_0 = \varphi(\omega_r), \quad b_K = \frac{1}{n!}\left\{\frac{d_K}{d\omega_K}\varphi(\omega)\right\}_{\omega = \omega_r}$$

If equation $\omega = \omega_c + \mu(t)$ is put in Equation 21 (on the assumption that $\omega_c = \omega_r$, $$\varphi(\omega) = b_0 + b_1\mu(t) + b_2\mu(t)^2 + b_3\mu(t)^3 \quad (22)$$

This Equation 22 is of the same form as Equation 5. Also, Equation 20 corresponds to Equation 3, differing only in that it is differential by time. Such a difference is not essential. Therefore, if it is possible to provide the response tuning circuit with the phase characteristic equal or akin to in FIG. 2, it is possible to discriminate whether the FM signal has passed through the center of the tuning circuit or through the band or band edge by using frequency discriminators instead of the detectors $14_1$–$14_n$ in the receiver in FIG. 1, for the same reason as described in the above embodiments.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. An object identification system comprising a transmitter having a carrier generator oscillating carriers of different frequencies, a modulation frequency oscillator oscillating a modulation frequency, phase-angle modulators making phase-angle modulation of the said carriers, and a means which combines the modulated signals from the phase-angle modulators and emits the combined signals as electromagnetic waves; a response device located on the object and having response tuning circuits which tune to specific frequencies of the modulated signals emitted thereto, and a means which reflects again said signals having passed through the tuning circuits as electromagnetic waves; and a receiver having a means receiving the said magnetic waves sent from the response device and separating the frequency components corresponding to the modulated signals into said different frequencies, means which takes out only the distortion component of the separated signals arising when they pass through the tuning circuits, and means which identifies the object through a code showing a prefixed combination of the distortion frequencies that have been taken out by the said means.

2. An object identification system according to claim 1 wherein the receiver has a first bandpass filter separating the designated modulated signals from the electromagnetic waves from the response device, first envelope detectors detecting the outputs of the said filters, and means taking the frequency component twice the modulation signal of the said distortion component out of the outputs transmitted from the envelope detectors.

3. An object identification system according to claim 2 wherein the means detecting the frequency signal twice the modulation frequency has second bandpass filters which are connected to the first envelope detectors and which pass the signals nearly twice the modulation frequency, second envelope detectors connected to these bandpass filters, and a code discriminator connected to the second envelope detectors.

4. An object identification system according to claim 2 wherein the means detecting the frequency signal twice the modulation frequency has waveform shapers connected to the first envelope detectors, counters connected to these waveform shapers via delay circuits, and the reset signal and gate signal generating circuit which controls the counters with respect to the waveform shaper outputs.

5. An object identification system according to claim 1 wherein the receiver has synchronization detectors having the first input terminals through which the signals from the response device are supplied and the second input terminals which the respective phase angle-modulated output signals from the transmitter are supplied directly, and the means which detects the frequency component twice the modulation frequency among the distortion components of the synchronization detector outputs sent from the response device.

6. An object identification system according to claim 5 wherein the means detecting the frequency signal of twice the modulation frequency among the synchronization detector outputs in the receiver, has bandpass filters which pass frequencies about twice the modulation frequency connected to each synchronization detector, envelope detectors connected to the respective bandpass filters, and code discriminators connected to these detectors.

7. An object identification system according to claim 5 wherein the means which detect frequency signals twice the modulation frequency among the synchronization detector outputs has waveform shapers connected to the synchronization detectors, counters connected to the waveform shapers via delay circuits, and reset signal and gate signal generating circuits which are provided to control the counters with respect to the output signal from the waveform shapers.

8. An object identification system according to claim 1 wherein the transmitter has the first gate circuits located on the paths of signals associated with the respective angle modulators, a clock pulse generator oscillating clock pulses which drive the said gate circuits one by one, and an antenna system which transmits the gate outputs as electromagnetic waves; and the receiver has the antenna system which receives the electromagnetic waves from the said transmitter, first envelope detectors connected to the antenna system, second gate circuits which are connected to the said detectors and which are driven by the clock pulses oscillated by the said clock pulse oscillator.

9. An object identification system according to claim 8 wherein the means detecting the frequency signals twice the modulation signal in the receiver has second bandpass filters which are connected to the first envelope detectors and which pass frequencies nearly twice the modulation frequency, the second gate circuits connected to the said bandpass filters, and code discriminators connected to these detectors.

10. An object identification system according to claim 8 wherein the means detecting the frequency signal nearly twice the modulation frequency has waveform shapers connected to the first envelope detectors, counters connected to these detectors via delay circuits, and reset signal and gate signal generating circuits which control the counters with respect to the said waveform shaper outputs.

11. An object identification system according to claim 1 wherein the means emitting phase-angle modulated signals from the said transmitter as electromagnetic waves contains the first antenna system; the receiver receives the said input signals through the first antenna system; the response device contains the second antenna system; and the said second antenna system is used for both reception of the said electromagnetic waves from the transmitter and transmission of them to the receiver.

12. An object identification system according to claim 11 wherein the means which takes the receiver input signal out of the said first antenna system is such that the signals are taken out through both terminals of a damping resistor connected in series to the said first antenna system.

13. An object identification system according to claim 11 wherein the means which takes the receiver input signal out of the said first antenna system has a four point bridge circuit in which the first antenna is connected to one arm of the bridge circuit; the transmitter output is supplied between a first pair of opposing points; the circuit is nearly balanced against the modulated output sent from the transmitter; and the receiver input signal is taken out from between a second pair of opposing points.

14. An object identification system according to claim 11 wherein the means detecting amplitude distortion in the receiver has the first bandpass filters passing carrier signals, the first envelope detectors connected to these filters, and the means detecting a frequency signal twice the modulation signal among said modulated signals.

15. An object identification system according to claim 1 wherein the transmitter has the first and second transmitting/receiving antennas arranged a fixed distance along a route on which each phase-angle modulator output is supplied and the object to be identified passes; and the receiver has the differential circuit which takes difference voltage out of the signals induced in the first and second antennas and the means which detects amplitude distortion components of the said modulated signals taken out by the differential circuit; and the malfunctioning of the circuit due to an external noise can be minimized by utilizing a difference voltage.

16. An object identification system according to claim 15 wherein the differential circuit comprises a four point bridge circuit in which said first and second transmitting receiving antennas are connected to the two arms, the transmitter output terminals are connected between a first pair of opposing points, and the receiver input terminals are connected between a second pair of opposing points.

References Cited

UNITED STATES PATENTS

| | | | |
|---|---|---|---|
| 3,022,492 | 2/1962 | Kleist et al. | 343—6.5 |
| 3,054,100 | 9/1962 | Jones | 343—6.5 |
| 3,145,380 | 8/1964 | Currie | 343—6.5 |

RICHARD A. FARLEY, *Primary Examiner.*

C. L. WHITHAM, *Assistant Examiner.*